(12) United States Patent
Mihara (10) Patent No.: US 9,769,146 B2
(45) Date of Patent: Sep. 19, 2017

(54) INFORMATION PROCESSING SYSTEM, INFORMATION PROCESSING METHOD, AND NON-TRANSITORY COMPUTER-READABLE MEDIUM

(71) Applicant: CANON KABUSHIKI KAISHA, Tokyo (JP)

(72) Inventor: Makoto Mihara, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 326 days.

(21) Appl. No.: 14/476,001

(22) Filed: Sep. 3, 2014

(65) Prior Publication Data
US 2015/0106903 A1    Apr. 16, 2015

(30) Foreign Application Priority Data

Oct. 16, 2013  (JP) .................................. 2013-215822

(51) Int. Cl.
*H04L 29/06* (2006.01)
*H04L 12/58* (2006.01)

(52) U.S. Cl.
CPC .......... *H04L 63/0815* (2013.01); *H04L 51/24* (2013.01); *H04L 63/0823* (2013.01)

(58) Field of Classification Search
None
See application file for complete search history.

(56) References Cited

U.S. PATENT DOCUMENTS

| 8,763,145 | B2* | 6/2014 | Mihara | G06F 21/6218 726/26 |
| 2009/0288084 | A1* | 11/2009 | Astete | G06F 9/45533 718/1 |
| 2011/0126002 | A1* | 5/2011 | Fu | H04L 63/0823 713/156 |
| 2011/0231919 | A1* | 9/2011 | Vangpat | H04L 63/0815 726/8 |
| 2014/0164776 | A1* | 6/2014 | Hook | H04L 9/14 713/171 |
| 2014/0337628 | A1* | 11/2014 | Amato | H04L 9/0825 713/171 |

FOREIGN PATENT DOCUMENTS

JP    2002222306 A    8/2002

* cited by examiner

*Primary Examiner* — Kaveh Abrishamkar
(74) *Attorney, Agent, or Firm* — Carter, DeLuca, Farrell & Schmidt, LLP

(57) ABSTRACT

An information processing system comprises: a management unit that performs management by associating an electronic certificate for a first group with notification destination information regarding a user who belongs to a second group and has a role in managing to allow the service to be used by the user belonging to the first group; and a notification unit that, in response to a remaining period until an expiration date of the electronic certificate falling below a predetermined value, identifies the notification destination information regarding the user belonging to the second group associated with the electronic certificate from among notification destination information, and performs a notification to update the electronic certificate based on the identified notification destination information.

10 Claims, 6 Drawing Sheets

400 CONSUMER TENANT MANAGEMENT TABLE

| CONSUMER TENANT ID 401 | TENANT NAME 402 | IdP ID 403 | ELECTRONIC CERTIFICATE 404 | CERTIFICATE EXPIRATION DATE 405 |
|---|---|---|---|---|
| 1001AA | X CORPORATION | IdP-A | Xaeigaovhio.... | 2013/10/7 11:53 |
| 1002AA | Y CORPORATION | IdP-B | ekthopqc.... | 2015/3/28 19:24 |
| 1003AA | Z CORPORATION | Local | | |

FIG. 4B

410 IdP MANAGEMENT TABLE

| IdP ID 411 | NOTIFICATION METHOD 412 | RELATED LICENSE 413 |
|---|---|---|
| Local | | |
| IdP-A | TENANT | Form |
| IdP-B | OPERATOR | |

FIG. 4C

420 LICENSE MANAGEMENT TABLE

| DISTRIBUTOR TENANT ID 421 | CONSUMER TENANT ID 422 | LICENSE 423 |
|---|---|---|
| 101AA | 1001AA | Form |
| 102AA | 1001AA | MDS |
| 102AA | 1002AA | MDS |
| 103AA | 1003AA | MDS |

FIG. 4D

430 USER MANAGEMENT TABLE

| USER ID 431 | TENANT ID 432 | EMAIL ADDRESS 433 | ROLE 434 |
|---|---|---|---|
| operator@11AA | 11AA | operator@sample.com | OPERATOR |
| admin@101AA | 101AA | admin@a.sales.co.jp | DISTRIBUTOR TENANT ADMINISTRATOR |
| user1@101AA | 101AA | user1@a.sales.co.jp | DISTRIBUTOR USER, FORM VENDOR |
| user2@101AA | 101AA | user2@a.sales.co.jp | DISTRIBUTOR USER, MDS VENDOR |
| admin@102AA | 102AA | admin@b.sales.co.jp | DISTRIBUTOR TENANT ADMINISTRATOR, MDS VENDOR |
| admin@103AA | 103AA | admin@c.sales.co.jp | DISTRIBUTOR TENANT ADMINISTRATOR, MDS VENDOR |
| admin@1001AA | 1001AA | admin@x.customer.co.jp | CONSUMER TENANT ADMINISTRATOR, FORM ADMINISTRATOR |
| user1@1001AA | 1001AA | user1@x.customer.co.jp | CONSUMER USER, FORM USER |
| admin@1002AA | 1002AA | admin@y.customer.co.jp | CONSUMER TENANT ADMINISTRATOR |
| user1@1002AA | 1002AA | user1@y.customer.co.jp | CONSUMER USER, MDS ADMINISTRATOR |
| admin@1003AA | 1003AA | admin@z.customer.co.jp | CONSUMER TENANT ADMINISTRATOR |
| user1@1003AA | 1003AA | user1@z.customer.co.jp | CONSUMER USER, MDS ADMINISTRATOR |

FIG. 4E

440 DATE/TIME MANAGEMENT TABLE

| ID 441 | DATE/TIME 442 |
|---|---|
| CERTIFICATE EXPIRATION CHECK | 2013/9/7 0:00 |

■SUBJECT:
EXPIRATION DATE OF CERTIFICATE IS APPROACHING

■TEXT:
(THIS EMAIL IS AUTOMATICALLY SENT FROM THE SYSTEM.)

MENU/FUNCTION:
REGISTRATION AND MANAGEMENT OF ID PROVIDER

THE EXPIRATION DATE OF THE ID PROVIDER CERTIFICATE IS APPROACHING. PLEASE UPDATE THE CERTIFICATE FILE BEFORE THE EXPIRATION DATE.

MORE INFORMATION REGARDING THE SETTINGS IS AVAILABLE AT THE FOLLOWING URL.
https:xxxxxxxxxxxxxxxxxxxxxxxxxxxxxxxxxxxxxx RELEVANT ID PROVIDER:
ID PROVIDER NAME: IdP-A

CERTIFICATE INFORMATION:
EXPIRATION DATE: 2013/10/07  11:53

~601

■SUBJECT:
EXPIRATION DATE OF CERTIFICATE IS APPROACHING

■TEXT:
(THIS EMAIL IS AUTOMATICALLY SENT FROM THE SYSTEM.)

MENU/FUNCTION:
REGISTRATION AND MANAGEMENT OF ID PROVIDER

THE EXPIRATION DATE OF YOUR CLIENT'S ID PROVIDER CERTIFICATE IS APPROACHING.

RELEVANT CONSUMER TENANT :
CONSUMER TENANT ID: 1001AA
CONSUMER'S DISPLAY NAME: X CORPORATION

CERTIFICATE INFORMATION:
EXPIRATION DATE: 2013/10/07  11:53

~602

INFORMATION PROCESSING SYSTEM, INFORMATION PROCESSING METHOD, AND NON-TRANSITORY COMPUTER-READABLE MEDIUM

BACKGROUND OF THE INVENTION

Field of the Invention

The present invention relates to an information processing system, an information processing method and a non-transitory computer-readable medium, and more particularly to processing for managing the expiration date of an electronic certificate used to enable single sign-on in a cloud service.

Description of the Related Art

Recently, there are many businesses that provide services to consumers by using servers installed on the Internet such as cloud-based services. These businesses provide a plurality of different services, and the consumers select a service that fits their needs from among the plurality of services and makes a contract for the service that they need.

With such a service, when a service provider provides a service to a consumer company, the service provider creates a new tenant and assigns the tenant to the consumer company. Also, an initial user for managing the newly created tenant on the consumer company side is created and registered in the tenant. Then, an administrator on the consumer company side logs into the service as the created initial user so as to make necessary settings including adding users to the assigned tenant, and thereby the consumer company can start using the service.

Meanwhile, Single Sign-On (hereinafter, referred to as "SSO") using a Security Assertion Markup Language (hereinafter, referred to as "SAML") is conventionally known as a technique for sharing an authentication among a plurality of servers that are on different domains. A system that implements the SAML includes a server group (Identity Provider, hereinafter, referred to as "IdP") that provides an authentication function, and at least one server group (Service Provider, hereinafter, referred to as "SP") that provides a function, with reliance on the result (assertion) of authentication performed by the IdP.

The SSO using the SAML is established based on the trust relationship between the IdP and the SP. Accordingly, it is necessary to establish in advance the trust relationship between the IdP and the SP before the SSO is implemented. The trust relationship is established by registering metadata and an electronic certificate in the SP, the metadata being data in which a scheme for performing SSO defined by the SAML protocol is written. In a cloud-based system, generally, the aforementioned metadata and electronic certificate are registered for each tenant, and thus settings need to be made for each consumer company.

The aforementioned electronic certificate has an expiration date, and the expiration date needs to be updated regularly. The expiration date of the electronic certificate is often set to as long as about two years, which makes it difficult for the person of the consumer company who is in charge of making settings to remember the update period and change settings. Also, the operation of changing settings requires a high level of skill, and therefore it is often the case that the operation is outsourced to the sales agent who is providing the license to the consumer. In this case, there is a need for the sales agent to offer a re-registration operation to the consumer so as to serve as a substitute to perform the re-registration operation when the expiration date has expired.

Conventionally, a method has been proposed in which the email address of the responsible contact person at each consumer company is registered in advance, and a notification is sent to the email addresses (see, for example, Japanese Patent Laid-Open No. 2002-222306).

The conventional method, however, has the following problems. For example, because the expiration date of the electronic certificate is long, the responsible contact person of the sales agent for each consumer may be changed to a different person. Accordingly, it is necessary to change the notification destination settings each time the responsible contact person is changed, which is troublesome. Also, if making a change in the notification destination settings is forgotten, there is a possibility that, at the time when a notification is actually sent, the responsible contact person is no longer working and thus the notification is not received. A method is conceivable in which sales agents are set in advance, and notifications are sent to all users of the sales agents. However, there are, among the users of the cloud service sales agents that provide a plurality of services, those who handle services that do not require SSO, and as a result, unnecessary notifications are created.

SUMMARY OF THE INVENTION

According to one aspect of the present invention, there is provided an information processing system that enables single sign-on with another information processing system that performs user authentication processing, the information processing system comprising: a providing unit configured to provide, based on an electronic certificate for a first group that is used to enable the single sign-on and has been issued by the other information processing system, a service to a user who belongs to the first group; a management unit configured to perform management by associating the electronic certificate for the first group with notification destination information regarding a user who belongs to a second group and has a role in managing to allow the service to be used by the user belonging to the first group; and a notification unit configured to, in response to a remaining period until an expiration date of the electronic certificate falling below a predetermined value, identify the notification destination information regarding the user belonging to the second group associated with the electronic certificate from among notification destination information managed by the management unit, and perform a notification to update the electronic certificate based on the identified notification destination information.

According to another aspect of the present invention, there is provided an information processing method for use in an information processing system that enables single sign-on with another information processing system that performs user authentication processing, the information processing method comprising: providing, based on an electronic certificate for a first group that is used to enable the single sign-on and has been issued by the other information processing system, a service to a user who belongs to the first group; performing management by associating the electronic certificate for the first group, with notification destination information regarding a user who belongs to a second group and has a role in managing to allow the service to be used by the user belonging to the first group; and in response to a remaining period until an expiration date of the electronic certificate falling below a predetermined value, identifying the notification destination information regarding the user belonging to the second group associated with the electronic certificate from among notification destination information managed in the management step, and performing a notification to update the electronic certificate based on the identified notification destination information.

According to another aspect of the present invention, there is provided a non-transitory computer-readable medium in which a program for causing a computer to function as the following units is stored: a providing unit configured to provide, based on an electronic certificate for a first group that is used to enable single sign-on and has been issued by another information processing system that performs user authentication processing, a service to a user who belongs to the first group; a management unit configured to perform management by associating the electronic certificate for the first group with notification destination information regarding a user who belongs to a second group and has a role in managing to allow the service to be used by the user belonging to the first group; and a notification unit configured to, in response to a remaining period until an expiration date of the electronic certificate falling below a predetermined value, identify the notification destination information regarding the user belonging to the second group associated with the electronic certificate from among notification destination information managed by the management unit, and perform a notification to update the electronic certificate based on the identified notification destination information.

According to the present invention, it is possible to provide a system that notifies the expiration date of an electronic certificate, wherein it is possible to reduce the operation of changing notification destination settings each time there is a change, and prevent a failure to provide a notification caused by forgetting to change the settings.

Further features of the present invention will become apparent from the following description of exemplary embodiments (with reference to the attached drawings).

DESCRIPTION OF THE EMBODIMENTS

Hereinafter, embodiments for carrying out the present invention will be described with reference to the drawings.

System Configuration

First, the present embodiment will be described assuming that the following services are made available on a server on the Internet and offered by the server:
a form service for generating a form on the Internet;
a print service for printing the generated form by using an image forming apparatus; and
a management service for managing an office printing environment.

Hereinafter, services that offer functions on the Internet such as those mentioned above will be referred to as "resource services". Note that the services that are offered as the resource services are not limited thereto, and may be other services.

Figure 1:
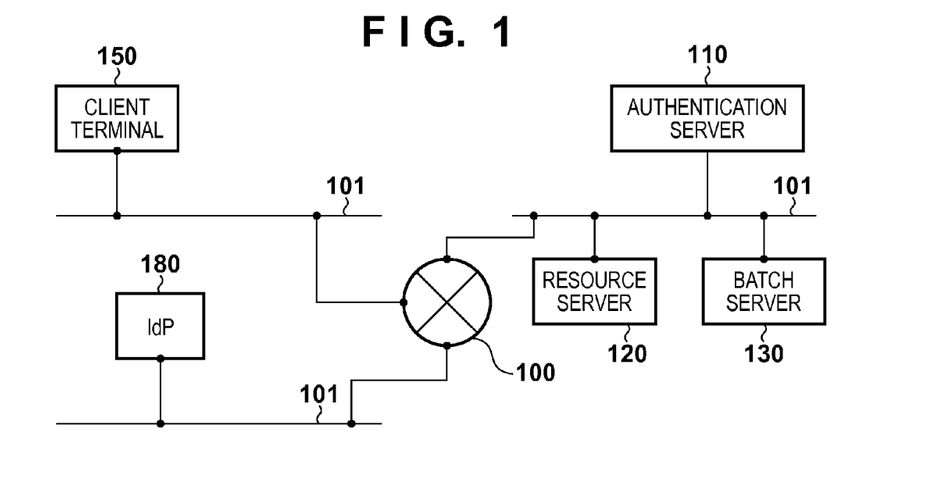
FIG. 1 is a diagram showing an exemplary configuration of a system.

An information processing system according to the present embodiment is implemented on a network having a configuration as shown in, for example, FIG. 1. In the present invention, a WWW (World Wide Web) system is configured as a WAN (Wide Area Network) 100. A LAN (Local Area Network) 101 connects the constituent elements.

An authentication server 110 performs user authentication by using authentication information. In the present embodiment, the aforementioned form service, print service and management service are made available by a resource server 120. Only one resource service may be made available on a single resource server, or a plurality of resource services may be made available on a single resource server. In the present embodiment, one authentication server and one resource server are provided, but a plurality of authentication severs and a plurality of resource servers may be provided. Alternatively, they may be provided as, for example, an authentication server system.

A batch server 130 manages tenant information of each consumer and provides an expiration notification. As used herein, the tenant indicates a unit (group) for which a service is provided by a cloud service, and for example, one or a plurality of users belong to one tenant. In the present embodiment, a consumer tenant will also be referred to as a first group and a distributor tenant will also be referred to as a second group.

A client terminal 150 includes a web browser 350 installed therein, and is capable of displaying, for example, a website provided by each server. An IdP (Identity Provider) 180 is an authentication server having an authentication function and provided separately from the authentication server 110. The authentication server 110, the resource server 120, the batch server 130, the client terminal 150 and the IdP 180 are connected to each other via the WAN 100 and the LAN 101. The authentication server 110, the resource server 120, the batch server 130, the client terminal 150 and the IdP 180 may reside on different LANs or may be reside on the same LAN. Also, the authentication server 110, the resource server 120 and the batch server 130 may reside in the same apparatus.

As used herein, the information processing system refers to a system that includes at least one log-in control server that performs user authentication processing, and a server that provides a service in response to the user authentication processing performed by the log-in control server being successful. However, the information processing system also encompasses a configuration in which these servers are combined into a single unit, and thus the information processing system does not necessarily include a plurality of severs. Also, the information processing system may include only a log-in control server.

Hardware Configuration

Figure 2:
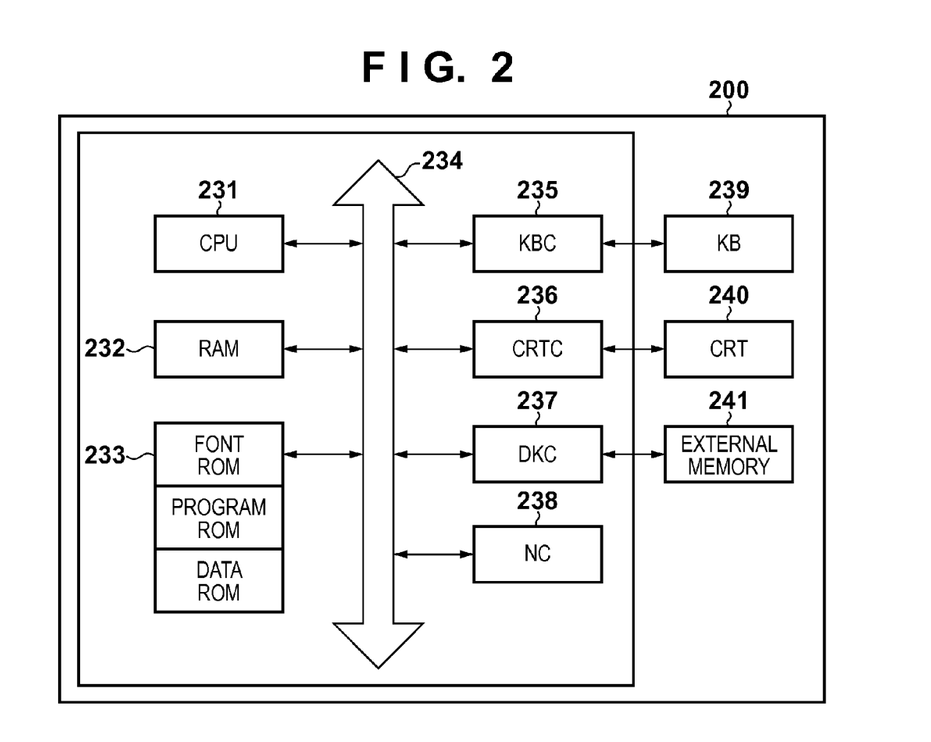
FIG. 2 is a diagram showing an exemplary hardware configuration of each apparatus.

FIG. 2 is a diagram showing an exemplary hardware configuration of the authentication server 110, the resource server 120, the batch server 130, the client terminal 150 and the IdP 180 according to the present embodiment. The hardware configuration diagram shown in FIG. 2 corresponds to a hardware block diagram of a generally used information processing apparatus, and the hardware configuration of a generally used information processing apparatus is applicable to the computers used in the present embodiment.

In FIG. 2, a CPU 231 executes a program, such as an OS or an application, stored in a program ROM in a ROM 233 or loaded into a RAM 232 from an external memory 241 such as a hard disk (HD). The CPU 231 also controls the blocks that are connected to a system bus 234. As used herein, the OS is an abbreviation for operating system that runs on the computer 200. The processing of each sequence, which will be described later, can be implemented by execution of the program.

The RAM 232 functions as a main memory, a work area or the like for the CPU 231. A keyboard controller (KBC) 235 controls key inputs from a keyboard 239 or a pointing device (not shown). A CRT controller (CRTC) 236 controls display on a CRT display 240. A disk controller (DKC) 237 controls access to data in the external memory 241 such as a hard disk (HD) in which various types of data are stored. A network controller (NC) 238 executes communication control processing with a computer or other devices that are connected via the WAN 100 or the LAN 101.

In the entire description given below, unless otherwise stated, the CPU 231 is the main piece of hardware to perform operation in the servers, and an application program installed in the external memory 241 is the main piece of software.

Software Configuration

Figure 3:
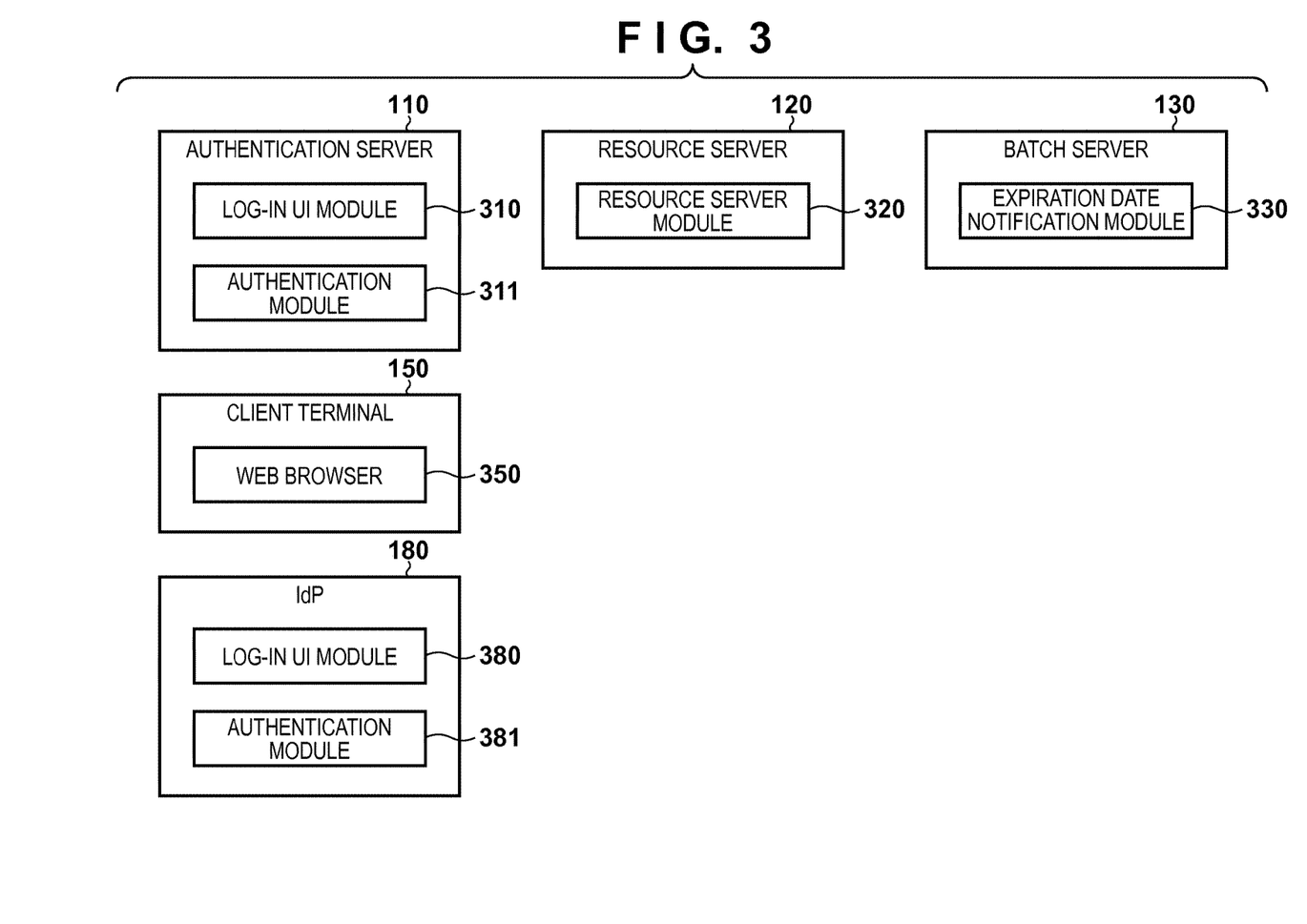
FIG. 3 is a diagram showing an exemplary software configuration of each apparatus.

FIG. 3 is a diagram showing an exemplary software configuration of the authentication server 110, the resource server 120, the batch server 130, the client terminal 150 and the IdP 180 according to the present embodiment. This diagram shows only modules that are necessary to describe the present embodiment, and thus other software modules may be included.

The authentication server 110 includes a log-in UI module 310 used to perform log-in processing of a user, and an authentication module 311 that performs user authentication processing. The resource server 120 includes a resource server module 320 that provides various types of services. The batch server 130 includes an expiration date notification module 330. Detailed processing performed by the expiration date notification module 330 will be described with reference to FIG. 5. The client terminal 150 includes the web browser 350, which is a user agent for utilizing the WWW. The IdP 180 includes a log-in UI module 380 and an authentication module 381, as with the authentication server 110. The authentication server 110 and the IdP 180 do not necessarily use the same authentication method, and it is possible to use conventional authentication processing methods (for example, authentication performed by using a combination of a user ID and a password).

Data Configuration

FIGS. 4A to 4E show data tables that associate various types of information and are stored in the external memory 241 of the authentication server 110. The data tables can be accessed from the authentication server 110 and the batch server 130. The data tables may be stored in, rather than the external memory 241, another server configured to be capable of communication via the LAN 101.

Figure 4A:
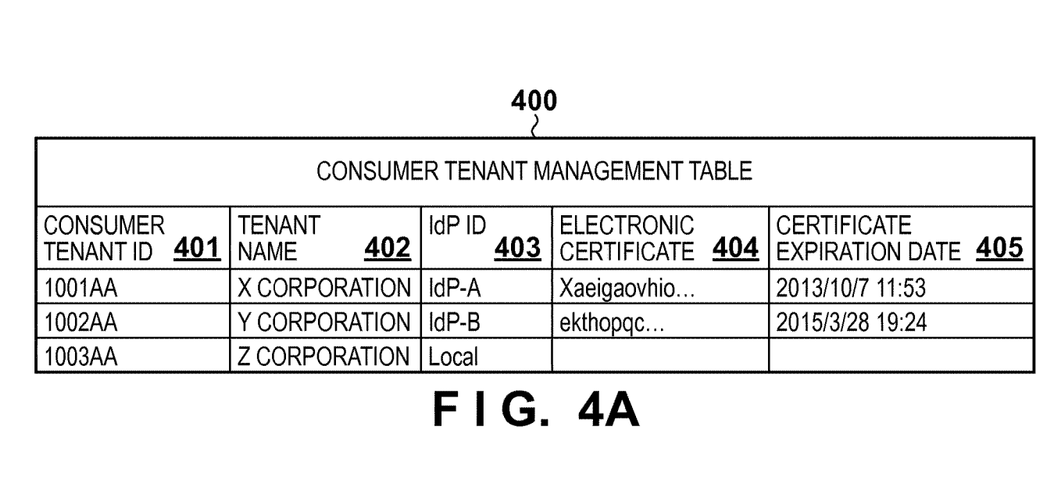
FIGS. 4A to 4E are diagrams showing exemplary table structures and data according to an embodiment of the present invention.

FIG. 4A shows an exemplary configuration of a consumer tenant management table 400. The consumer tenant management table 400 manages consumer tenants such that one consumer tenant is used for one consumer contract. The consumer tenant management table 400 includes a consumer tenant ID 401 for uniquely identifying a consumer tenant, a tenant name 402 indicating the name of the tenant, and an IdP ID 403 for identifying the IdP used by the tenant. Furthermore, the consumer tenant management table 400 further includes an electronic certificate 404 indicating electronic certificate data for establishing SSO (single sign-on) with the IdP, and a certificate expiration date 405 of the electronic certificate 404.

Figure 4B:
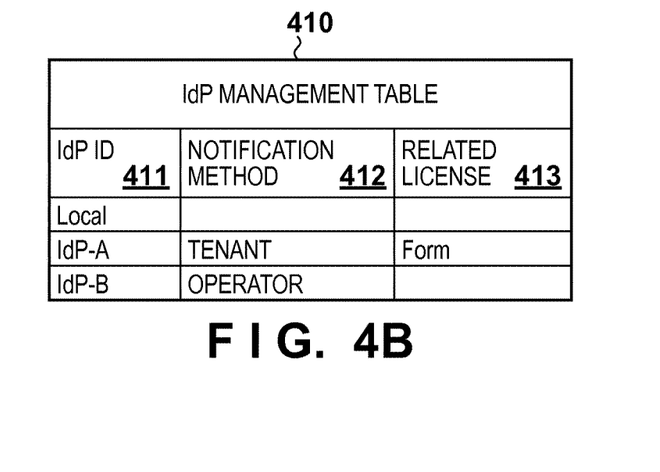

FIG. 4B shows an exemplary configuration of an IdP management table 410. The IdP management table 410 includes an IdP ID 411 for uniquely identifying an IdP, a notification method 412 indicating a method for sending a notification (in this example, a notification indicating that the electronic certificate has been expired), and a related license 413. The related license 413 indicates the type of service the license of the IdP indicated in the IdP ID is related. In the IdP ID 411, a value of "Local" or any value of ID (identification information) corresponding to the IdP is registered. If the value of "Local" has been set, it indicates that log-in processing is performed by the authentication server 110 itself so as to use the information processing system. The value of "Local" is set when SSO is not established. If an IdP_ID corresponding to any one of IdPs has been set, it indicates that log-in processing is performed on the IdP 180 side so as to use the information processing system through SSO.

In the notification method 412, a value of "Tenant" or a value of "Operator" is set. If the value of "Tenant" has been set, it indicates that a notification is sent to the consumer tenant registering the electronic certificate and the distributor tenant issuing the license to the consumer tenant to use the service. If the value of "Operator" has been set, it indicates that a notification is sent to the user having the right to act as a system operator. The notification methods mentioned here are merely exemplary, and other methods can be used such as sending a notification to an IdP administrator, or to a specific email address. In the related license 413, a value of license corresponding to one of the services that are available in the system such as "Form", "Print" and "MDS". In the present embodiment, for example, "Form" is set when the related service is the form service, "Print" is set when the related service is the print service, and "MDS" is set when the related service is the management service. If no value is set, it indicates that a notification is performed irrespective of the license.

Figure 4C:
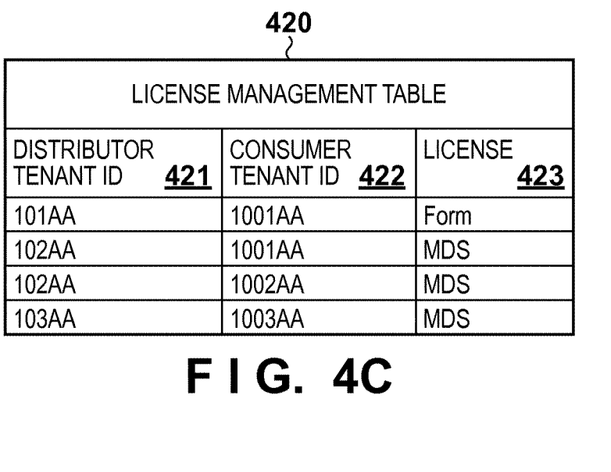

FIG. 4C shows an exemplary configuration of a license management table 420. The license management table 420 manages which license each distributor tenant provides to which consumer tenant. The licenses are provided for each resource service. The form service is managed with "Form" license, the print service is managed with "Print" license, and the management service is managed with "MDS" license.

The license management table 420 includes a distributor tenant ID 421 for uniquely identifying a distributor issuing a license, a consumer tenant ID 422 for uniquely identifying a consumer to which a license has been given, and a license 423 indicating the type of license issued/given.

Figure 4D:
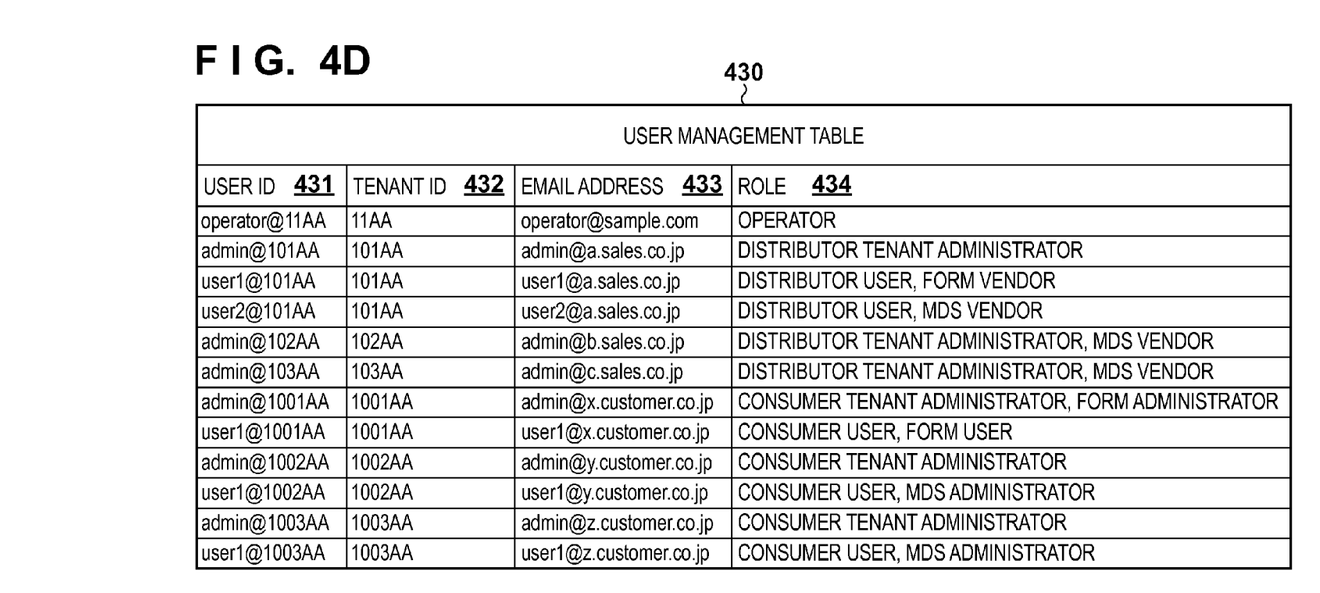

FIG. 4D shows an exemplary configuration of a user management table 430. The user management table 430 manages information regarding all users in the system of the present embodiment. The user management table 430 includes a user ID 431 for uniquely identifying a user, a tenant ID 432 for uniquely identifying the tenant to which the user belongs, an email address 433 indicating the email address of the user, and a role 434 that manages the user's role on the system. In the role 434, the following values can be stored:

"Operator" indicating that the user is a system operator;

"Distributor tenant administrator" and "Distributor user" indicating whether the user is an administrator or an ordinary user in the distributor tenant;

"Form vendor", "Print vendor" and "MDS vendor" indicating that the user can handle the corresponding license in the distributor tenant;

"Consumer tenant administrator" and "Consumer user" indicating whether the user is an administrator or an ordinary user in the consumer tenant; and "Form user", "Form administrator", "Print administrator", "Print user", "MDS administrator" and "MDS user" indicating that the user is an administrator or a user of the corresponding resource service in the consumer tenant.

In the role 434, one or more values may be set from among the values given above. Also, the roles that can be set in the role 434 are not limited to those given above. In the present embodiment, as the notification method, a notification is sent by email. Accordingly, as the notification destination information, email addresses are managed. However, other notification methods may be used.

Figure 4E:
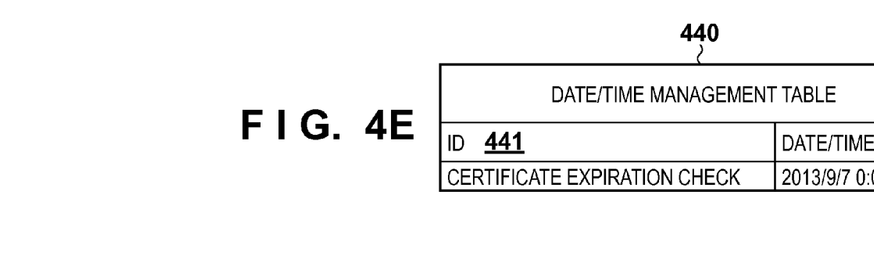

FIG. 4E indicates an exemplary configuration of a date/time management table 440. The date/time management table 440 includes an ID 441 for uniquely identifying the type of management to be performed, and a date/time 442 indicating the date and time the management is to be performed. In the ID 441, for example, a value of "Certificate expiration check" is written, and the date and time the system is to perform the management is stored in the date/time 442.

Processing Flow

Figure 5:
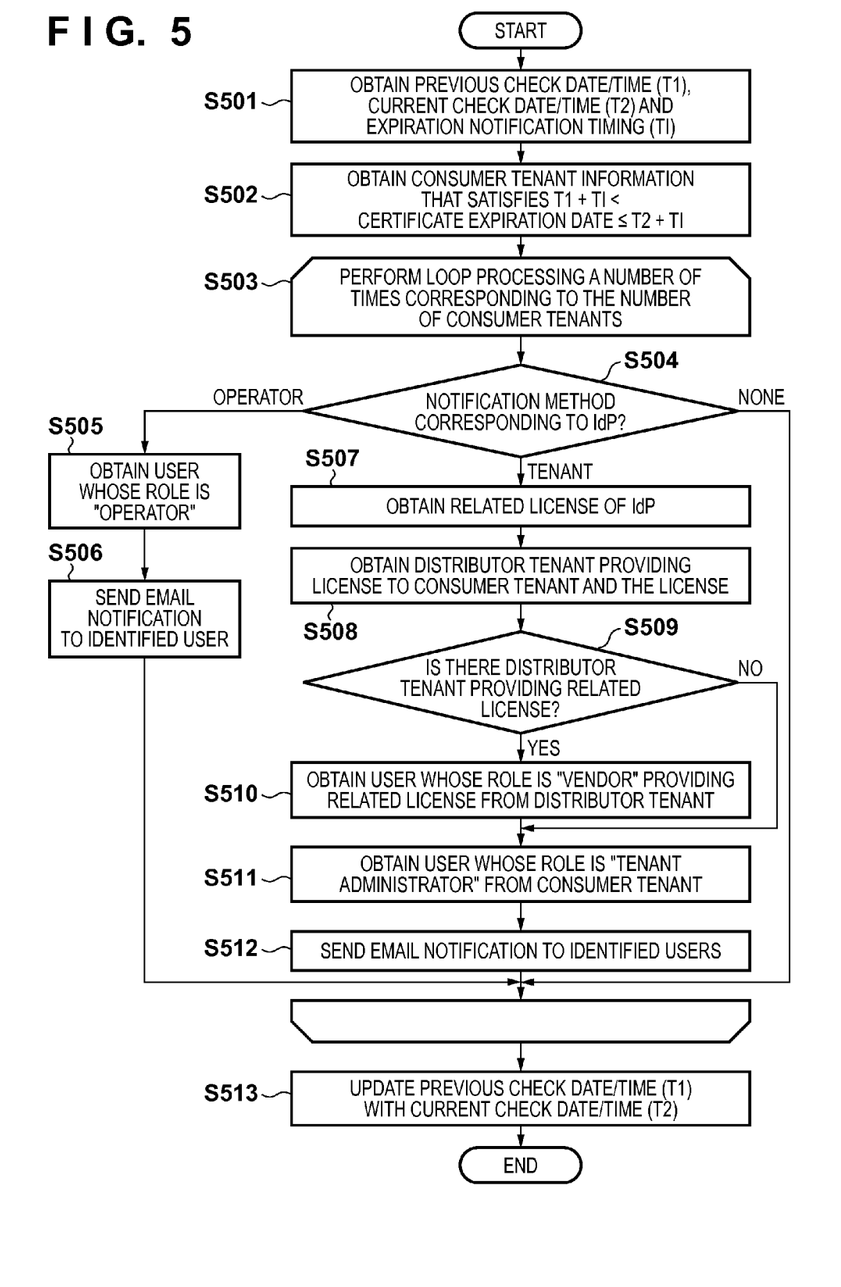
FIG. 5 is a flowchart illustrating processing for determining a notification destination and sending a notification according to an embodiment of the present invention.

FIG. 5 is a flowchart illustrating processing for determining a notification destination and sending an email notification so as to notify the expiration of the electronic certificate. The following description will be given assuming that this processing is executed by the expiration date notification module 330 of the batch server 130 regularly once a day. The execution timing is not limited thereto, and the processing may be executed regularly at a time interval set by an administrator or the like.

In S501, the batch server 130 obtains various types of date/time information. First, the batch server 130 obtains, from the date/time management table 440, the date and time the previous certificate expiration check was carried out (T1). Next, the batch server 130 obtains the current date and time (T2). Then, the batch server 130 obtains an expiration notification timing (TI) stored in the external memory 241. As the notification timing (TI), for example, "before 30 days" is set, which is stored in the storage unit as a threshold value for the remaining period until the expiration date. A plurality of notification timings may be set. In this case, the processing spanning from step S502 to step S512 is carried out a number of times corresponding to the number of notification timings that have been set. It is thereby possible to, for example, send an expiration notification a plurality of times at the timing when the remaining period falls below predetermined set threshold values such as "before 30 days", "before 7 days", and "before 1 day".

In S502, the batch server 130 obtains an electronic certificate for which an expiration notification needs to be sent. The batch server 130 searches for an electronic certificate whose expiration date is in a period between the previous check date/time (T1)+the notification timing (TI) and the current date/time (T2)+the notification timing (TI). This processing is implemented by searching the certificate expiration dates 405 of the consumer tenant management table 400.

For example, it is assumed that the previous check date/time (T1) is "2013/9/7 0:00", the current check date/time (T2) is "2013/9/8/0:00", and the expiration notification timing (TI) is "before 30 days". Then, the following is obtained:

$T1+TI=2013/10/7\ 0:00;$ and $T2+TI=2013/10/8\ 0:00.$

Accordingly, the batch server 130 searches for an electronic certificate whose expiration date is in a period between 2013/10/7 0:00 and 2013/10/8 0:00. In this example, in the consumer tenant management table 400 shown in FIG. 4A, the electronic certificate of the tenant corresponding to "2013/10/7 11:53" in the certificate expiration date 405 and having a consumer tenant ID of "1001AA" satisfies the above condition. Accordingly, it is determined that a notification is to be sent to the tenant corresponding to the consumer tenant ID of "1001AA".

S503 shows loop processing performed a number of times corresponding to the number of consumer tenants. In the above example, only the tenant corresponding to the consumer tenant ID of "1001AA" is detected as satisfying the above condition, and thus only the processing spanning from step S504 to step S512 is performed for the tenant corresponding to the consumer tenant ID of "1001AA". If, on the other hand, a plurality of tenants for which an expiration notification needs to be sent are detected in S502, the batch server 130 repeats the processing spanning from step S504 to step S512 a number of times corresponding to the number of tenants.

In S504, the batch server 130 identifies notification processing corresponding to the IdP. The IdP is identified based on the IdP ID 403 of the consumer tenant management table 400 shown in FIG. 4A. In this example, the IdP ID corresponding to the consumer tenant ID of "1001AA" is "IdP-A". Next, from the IdP management table 410 shown in FIG. 4B, the notification method corresponding to the IdP ID of "IdP-A" is searched for so as to identify the notification method. In this example, "IdP-A" is set for the consumer tenant corresponding to the consumer tenant ID of "1001AA", and thus the notification method is "Tenant". If it is determined in S504 that the notification method is "Tenant", the procedure advances to S507.

In S507, the batch server 130 obtains a license for which a notification needs to be sent from the related license 413 of the IdP management table 410 shown in FIG. 4B. If a specific license has been set, the IdP is handled as being related to the license. If nothing has been set, the IdP is handled as being related to all licenses. In this example, the IdP ID of "IdP-A" has a related license of "Form".

In S508, the batch server 130 obtains the distributor tenant providing the license to the consumer tenant and the type of the license. Based on the consumer tenant ID 422 of the license management table 420 shown in FIG. 4C, the batch server 130 obtains the distributor tenant ID 421 providing the license to the consumer tenant and the license 423. In this example, the distributor tenant corresponding to the distributor tenant ID of "101AA" provides the "Form" license to the consumer tenant corresponding to the consumer tenant ID of "1001AA". Also, the distributor tenant corresponding to the distributor tenant ID of "102AA" provides the "MDS" license to the consumer tenant corresponding to the consumer tenant ID of "1001AA".

In S509, the batch server 130 identifies the distributor tenant selling the related license obtained in S507 based on the distributor tenant information and the license information obtained in S508, and determines the distributor tenant to which an expiration notification needs to be sent. In this example, the distributor tenant corresponding to the distributor tenant ID of "101AA" provides the "Form" license. The "MDS" license provided by the distributor tenant corresponding to the distributor tenant ID of "102AA" is not the related license, and thus is excluded.

In S509, the batch server 130 determines whether or not there is a relevant distributor tenant to which an expiration notification needs to be sent. If it is determined that there is a relevant distributor tenant (YES in S509), the procedure advances to S510. If it is determined that there is no such a distributor tenant (NO in S509), the procedure advances to S511.

In S510, the batch server 130 identifies a user who can handle the license obtained in S507 from among the users in the distributor tenant. This processing prevents unnecessary notifications to be sent to users other than the relevant user. The batch server 130 obtains, from the user management table 430 shown in FIG. 4D, all users having the tenant ID identified in S509 written in the tenant ID 432 and having a role capable of handling the license obtained in S507 written in the role 434. In this example, the user whose tenant ID 432 is "101AA" and whose role 434 is "Form vendor" is obtained, and thus the user whose user ID is "user01@101AA" is identified as a user to which a notification needs to be sent.

In S511, the batch server 130 identifies the administrator user of the consumer tenant registering the expired certificate. From the user management table 430 shown in FIG. 4D, the batch server 130 obtains all users having the tenant ID obtained in S502 written in the tenant ID 432 and whose role 434 is "Consumer tenant administrator". In this example, the user whose tenant ID 432 is "1001AA" and whose user ID is "admin@1001AA" is identified as a user to which a notification needs to be sent.

In S512, the batch server 130 sends an email notification to the users, to which a notification needs to be sent, identified in steps S510 and S511. First, the batch server 130 obtains email addresses from the email addresses 433 of the user management table 430 shown in FIG. 4D based on the identified user IDs. In this example, "user1@a.asles.co.jp", which is the email address of the user having the user ID of "user01@101AA", and "admin@x.customer.co.jp", which is the email address of the user having the user ID of "admin@1001AA", are obtained. Next, the batch server 130 sends an email to the obtained email addresses.

Figure 6:
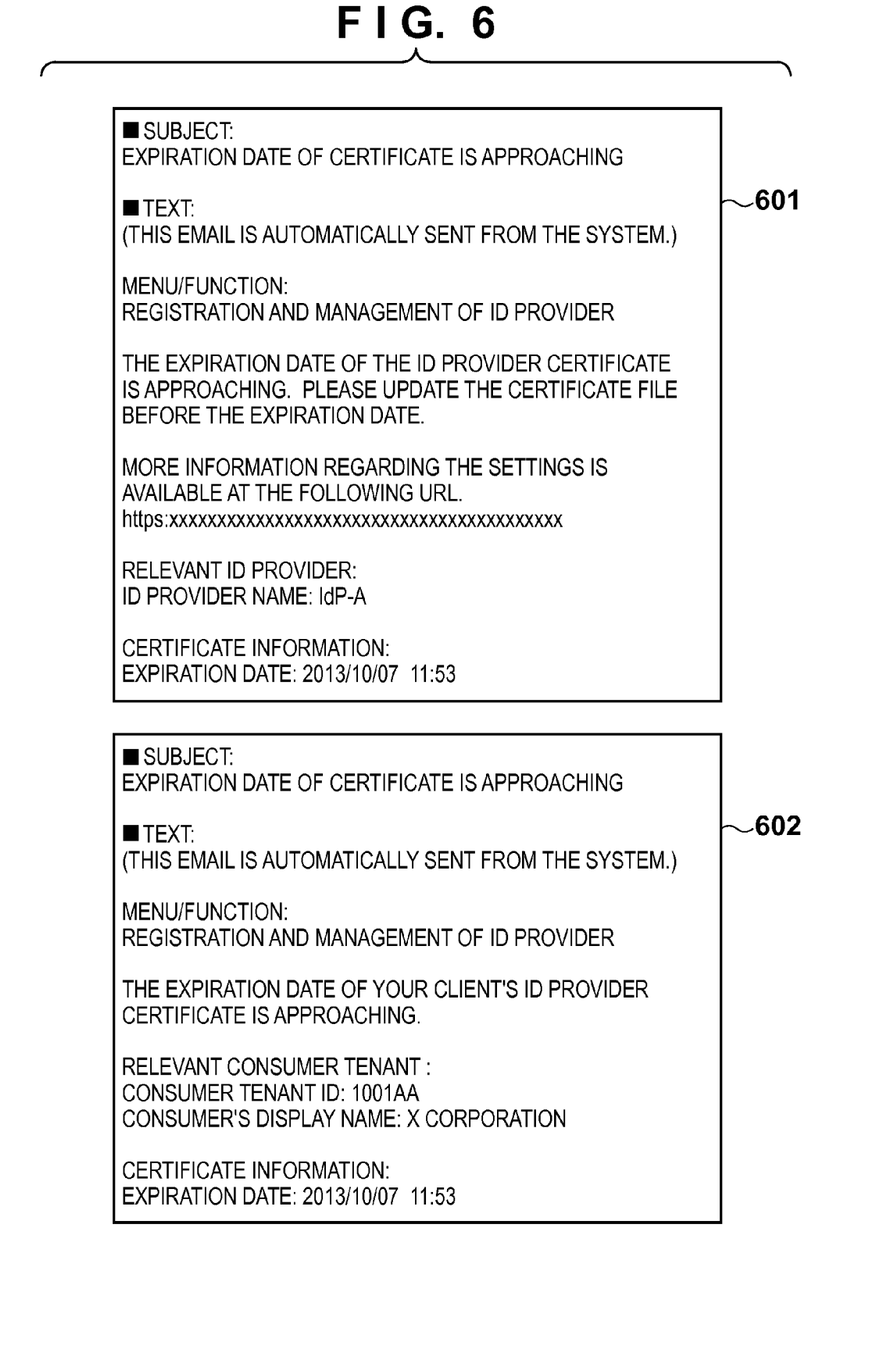
FIG. 6 is a diagram showing exemplary content of emails sent as a notification.

FIG. 6 shows examples of emails sent as a notification. A notification email 601 is an example of an email received by the consumer administrator user (whose roll is "consumer tenant administrator"). Likewise, a notification email 602 is an example of an email received by the responsible contact person of the distributor (whose role is " . . . vendor"). In the notification email 601, the IdP of the consumer tenant to which the consumer tenant administrator whose is a receiver of the email belongs, the expiration date of the electronic certificate of the IdP, and a message prompting the receiver to update the electronic certificate are written. In the notification email 602, the consumer tenant ID and tenant name of the relevant tenant, and the expiration date of the electronic certificate are written. Note that the content of emails is not limited thereto, and for example, information managed by the tables shown in FIGS. 4A to 4E may be included.

If, on the other hand, it is determined in S504 that the notification method 412 is "Operator", the procedure advances to S505. In S505, the batch server 130 identifies a user whose role 434 is "Operator" from among the user management table 430 shown in FIG. 4D. In this example, the user having a user ID of "operator@11AA" is identified.

In S506, the batch server 130 sends an email notification to the user identified in S505. Here, the batch server 130 obtains an email address that corresponds to the identified user ID from among the email addresses 433 of the user management table 430, and sends an email to the obtained email address. In this example, "operator@sample.com", which is the email address of the user having the user ID of "operator@11AA" is obtained, and the batch server 130 sends an email notification to that address.

If it is determined in S504 that no notification method is set, the procedure proceeds to process the next consumer tenant.

When the processing has been performed on all consumer tenants, the batch server 130 updates the executed date/time in S513. To be specific, the batch server 130 updates the certificate expiration check date/time 442 of the date/time management table 440 with the current check date/time (T2) obtained in S501. The electronic certificate for which an expiration notification has been sent once is excluded from the next expiration notification processing.

As described above, according to the present invention, it is possible to provide a system that notifies the expiration date of an electronic certificate, wherein it is possible to reduce the operation of changing notification destination settings each time there is a change, and prevent a failure to provide a notification caused by forgetting to change the settings. It is also possible to send an expiration notification of an electronic certificate to an appropriate responsible contact person.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-215822, filed Oct. 16, 2013, which is hereby incorporated by reference herein in its entirety.

What is claimed is:

1. An information processing system that enables single sign-on with another information processing system that performs user authentication processing, the information processing system comprising:
    one or more processors; and
    at least one memory coupled to the one or more processors, the at least one memory having instructions stored thereon which, when executed by the one or more processors, cause the information processing system to:
    perform authentication processing based on an electronic certificate for a first tenant that is used to enable the single sign-on and has been issued by the other information processing system; provide, based on a result of the authentication processing, a service to a user who belongs to the first tenant;
    manage, with each tenant, a user who belongs to the first tenant and a user who belongs to a second tenant, and perform management by associating the electronic certificate for the first tenant with notification destination information regarding a user who belongs to the second tenant and has a role in managing to allow the service to be used by the user belonging to the first tenant, and a role corresponding to a license of a service to be provided to a user who belongs to the first tenant;
    in response to a remaining period until an expiration date of the electronic certificate for the first tenant falling below a predetermined value, identify notification destination information regarding a user who belongs to the second tenant associated with the electronic certificate and is assigned the role from among managed notification destination information; and
    perform, based on the identified notification destination information regarding the user who belongs to the second tenant, a notification to update the electronic certificate.

2. The information processing system according to claim 1, wherein the managing includes associating the user belonging to the second tenant having the role of allowing the service to be used, with each type of provided service.

3. The information processing system according to claim 1, wherein the managing includes associating the information processing system that performs user authentication processing with each type of provided service.

4. The information processing system according to claim 3, wherein
    the managing further includes associating a performed notification method with each information processing system that performs user authentication processing, and
    the performing of the notification to update the electroniccertificate further includes performing the notification in accordance with the notification method.

5. The information processing system according to claim 1, wherein
    the managing further includes associating a role of each of the users belonging to the first and second tenants, with notification destination information,
    the identifying further includes identifying the notification destination information regarding the one who has a predetermined role among the users belonging to the first and second tenants; and
    the performing of the notification includes performing, based on the identified notification destination information regarding the user who belongs to the second tenant, the notification to update the electronic certificate.

6. The information processing system according to claim 1, wherein a plurality of values are set as the predetermined value.

7. The information processing system according to claim 1, wherein
    the notification destination information is an email address, and
    the notification is performed by sending an email using the email address.

8. The information processing system according to claim 1, wherein the performing the notification includes adding, to the notification, at least one of information regarding the other information processing system that has issued the electronic certificate, the expiration date of the electronic certificate, or information regarding the first tenant.

9. An information processing method for use in an information processing system that enables single sign-on with another information processing system that performs user authentication processing, the information processing method comprising:
    performing authentication processing based on an electronic certificate for a first tenant that is used to enable the single sign-on and has been issued by the other information processing system;
    providing, based on a result of the authentication processing, a service to a user who belongs to the first tenant;
    managing, with each tenant, a user who belongs to the first tenant and a user who belongs to a second tenant;
    performing management by associating the electronic certificate for the first tenant, with notification destination information regarding a user who belongs to the second tenant and has a role in managing to allow the service to be used by the user belonging to the first tenant, and a role corresponding to a license of a service to be provided to a user who belongs to the first tenant;
    in response to a remaining period until an expiration date of the electronic certificate for the first tenant falling below a predetermined value, identifying notification destination information regarding a user who belongs to the second tenant associated with the electronic certificate and is assigned the role from among notification destination information managed in the management; and
    performing, based on the identified notification destination information regarding the user who belongs to the second tenant, a notification to update the electronic certificate.

10. A non-transitory computer-readable medium storing a computer program that, when executed by a computer, causes the computer to:
    perform authentication processing based on an electronic certificate for a first tenant that is used to enable single sign-on and has been issued by another information processing system that performs user authentication processing; provide, based on a result of the authentication processing, a service to a user who belongs to the first tenant;
    manage, with each tenant, a user who belongs to the first tenant and a user who belongs to a second tenant, and perform management by associating the electronic certificate for the first tenant with notification destination information regarding a user who belongs to the second tenant and has a role in managing to allow the service to be used by the user belonging to the first tenant, and a role corresponding to a license of a service to be provided to a user who belongs to the first tenant;

in response to a remaining period until an expiration date of the electronic certificate for the first tenant falling below a predetermined value, identify notification destination information regarding a user who belongs to the second tenant associated with the electronic certificate and is assigned the role from among the managed notification destination information; and perform, based on the identified notification destination information regarding the user who belongs to the second tenant, a notification to update the electronic certificate.

* * * * *